Dec. 20, 1966    M. F. LYNCH    3,292,902
PORTABLE TIRE LIFT
Filed March 23, 1965
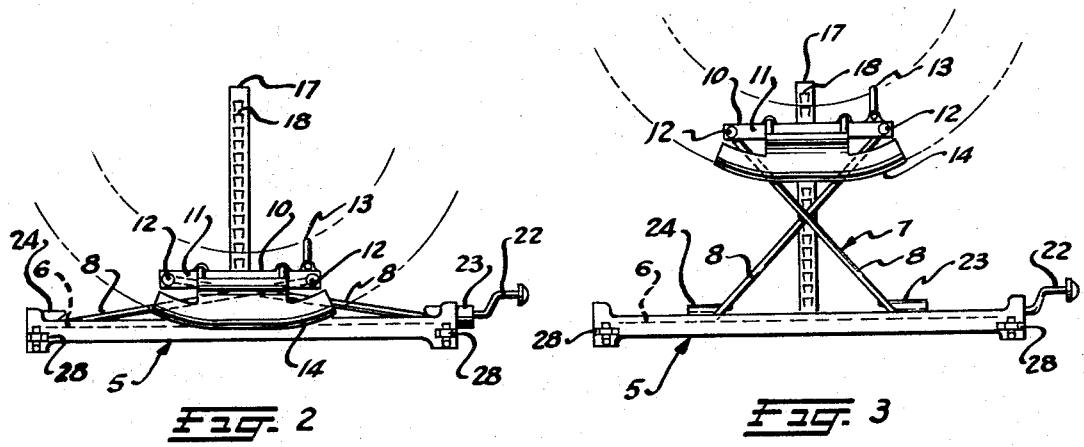
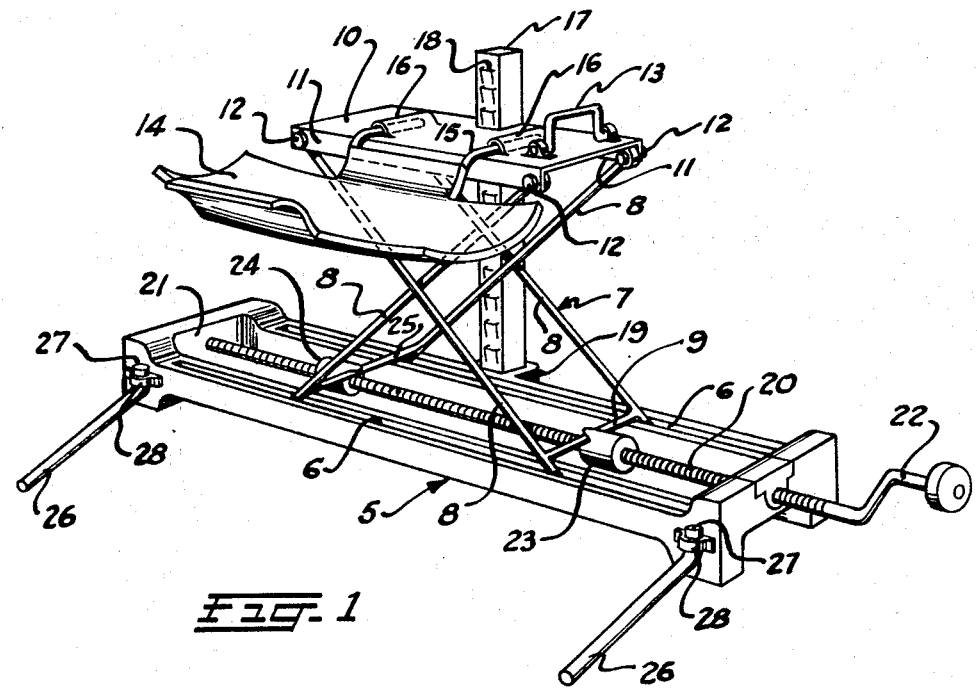
INVENTOR
MICHAEL F. LYNCH

3,292,902
PORTABLE TIRE LIFT
Michael F. Lynch, 3 Amherst Ave., Albany, N.Y. 12208
Filed Mar. 23, 1965, Ser. No. 442,003
2 Claims. (Cl. 254—122)

This invention relates to both automotive vehicles and tools, and more particularly, to a tool used by people who drive and or service automotive vehicles, and still more particularly, to a tool in the form of a portable tire lift for use on automotive vehicles and the like.

The changing of a tire of an automotive vehicle never presented any problem until the event of streamlining, and the resultant overhanging bodies with their semi-enclosed wheels, by adding weight to the vehicle, required larger and heavier tires. These larger and heavier tires are more and more difficult to lift into place on the wheel, particularly since the present day tires are nearly always on the extra wheel of the car.

It is, therefore, the principal object of this invention to provide a tire lift that is not only portable, but one that can be used by anyone who may have to change the tire on a car, regardless of the location of the car.

Another object of this invention is to provide a tire lift that can be quickly dissembled and stored, until needed, in a small space, such as in the trunk of a car.

Another object of this invention is to provide a tire lift that is fully adjustable and therefore adaptable so that the tire may be placed on any size of automotive vehicle.

Another object of this invention is to provide a tire lift so designed and constructed that it cannot collapse and injure the person using it as the tire is being lifted into the desired position for placement on an automotive vehicle.

Still another object of this invention is to provide a tire lift that is adjustable by means of a manually operated screw rather than by hydraulics and the like.

Other objects of my invention will become evident from the following detailed description, taken in conjunction with the accompanying drawing, in which:

FIGURE 1 is a pictorial view of this invention assembled and ready for use.

FIGURE 2 is a front view of this invention in position for the lifting of a tire, partly shown in phantom lines.

FIGURE 3 is a front view of this invention with the tire supporting member in the lifted position. The lifted tire is partly shown in phantom lines.

Referring now to the drawing, it will be seen that this invention consists of a hollow rectangular base 5 that appears as an inverted U-shaped member, when viewed from the end, and which embodies a pair of equally spaced and parallel longitudinally disposed troughs 6 in which rests the lower ends of the X-shaped support 7 which is fabricated from four bars 8, two of which are connected at the lower end by the laterally disposed bar 9. A rectangular lifting plate 10 has its two longitudinally disposed edges downwardly turned to form flanges 11 to which are hingedly secured the upper ends of the aforesaid round bars 8 by means of the headed pins 12, as best shown in FIGURE 1 of the appended drawing.

A folding inverted U-shaped handle 13 is secured to one end of the aforesaid rectangular lifting plate 10, as is the tire supporting member 14, which is removably secured to the rectangular lifting plate 10 my means of two parallel and spaced bars 15 that have one end fitted into the raised inverted U-shaped bar holders 16. These bar holders 16 are integral with the lifting plate 10, which in turn is supported by the vertically disposed support post 17, which has a plurality of equally spaced ridges 18 on the one surface thereof, that actually support the lower edge of one of the previously mentioned flanges 11 of the invention. The aforesaid support post 17 has its lower end fitted into the socket 19 that is centrally located on, and integrally with, the external surface on one of the aforesaid troughs 6 of the rectangular base 5. The just mentioned base 5 is also fitted with, and supports the screw 20 that is centrally located laterally, and which has one end terminating in the end 21 of the aforesaid rectangular base 5, while the other end of the screw terminates in the handle 22. A cylindrical support holder 23, having internal threads, is screwed onto the screw 20, which has that half of its threads, on which the aforesaid cylindrical support holder 23 is screwed, formed as right-hand threads and the other half of the same screw being provided with left-hand threads on which the cylindrical support holder 24 is screwed, the aforesaid support holder 24 being in contact with the cross-bar 25 that has each end secured to one of the aforesaid bars 8, as clearly shown in FIGURE 1 of the drawing. The purpose of the just described construction of this detail of the invention is to hold and move the legs of the aforesaid X-shaped support 7 of this novel invention.

An angularly disposed support bar 26 has one end terminated in a vertical member 27 which is removably fitted into the U-shaped socket 28 that is integral with one side and each end of the aforesaid rectangular base 5.

The operation of this novel invention, the construction of which I have just described in detail, is quite simple. When not in actual use, the two aforesaid support bars 26 are either removed from the rectangular base 5 or else folded against one side thereof, while the support post 17 has been removed from its holding socket 19, and the handle 22 of the invention's screw 20 has been rotated in such a manner as to cause the legs of the X-shaped support 7 to spread and thus lower the rectangular top plate 10 and the tire-supporting member 14. When one desires to raise a tire to the desired height for placement on an automotive vehicle all one has to do is to set the tire in the contoured tire supporting member 14, after the invention has been assembled, and manually rotate the crank handle 22, as will be clearly understood by examination of the appended drawing.

Various changes may be made in the specific embodiment of my present invention without departing from the spirit thereof, or from the scope of the appended claims.

What I claim is:

1. A portable tire lift of the character described, comprising a rectangular base; a lifting plate disposed above said base; a foldable X-shaped elevating means, the lower ends of said means being slidably supported by said base and the upper ends thereof being hingedly fastened to said plate; a tire supporting member having the configuration of part of a tire of an automotive vehicle, the said supporting member being secured to and projecting outward from the said lifting plate; a vertically disposed supporting post projecting upward from the said base and slidably received by said lifting plate; means on said lifting plate and said post for selectively supporting said lifting plate at predetermined heights; and means supported by said base and connected to the lower ends of said elevating means to raise and lower said lifting plate.

2. A portable tire lift of the character described, comprising a rectangular base; a rectangular lifting plate disposed above said base; a foldable X-shaped elevating means, the lower ends of said means being slidably supported by said base and the upper ends thereof being hingedly fastened to said plate; a tire supporting member having the configuration of part of a tire of an automotive vehicle, the said supporting member being secured to and projecting outward from the said lifting plate; a vertically disposed supporting post having a plurality of equally spaced ridges on which rests one flanged edge of the said rectangular lifting plate, the said supporting post projecting upward from the said base and supporting the said rectangular lifting plate at predetermined heights; manually operated screw mounted on said base; means interconnecting said screw and the lower ends of said elevating means for raising and lowering said tire supporting member on which the tire of an automotive vehicle is placed when a tire of the said vehicle is to be changed; and a pair of spaced angularly disposed ground engaging stabilizing legs secured to one side of said base below said supporting member to prevent said lift from tipping over when the tire is being lifted.

References Cited by the Examiner

UNITED STATES PATENTS

| | | | |
|---|---|---|---|
| 1,274,546 | 8/1918 | Hilliker | 254—122 |
| 2,486,918 | 11/1949 | Bowen | 254—126 |
| 3,096,967 | 7/1963 | Duke | 254—126 |

WILLIAM FELDMAN, *Primary Examiner.*

OTHELL M. SIMPSON, *Examiner.*